UNITED STATES PATENT OFFICE.

OTTO WALLACH, OF BONN, PRUSSIA, GERMANY.

MANUFACTURE OF COLORING-MATTER.

SPECIFICATION forming part of Letters Patent No. 269,359, dated December 19, 1882.

Application filed October 11, 1881. (Specimens.) Patented in Germany August 9, 1881, No. 18,861.

*To all whom it may concern:*

Be it known that I, Prof. OTTO WALLACH, a resident of the city of Bonn, in the Kingdom of Prussia, German Empire, have invented a new and useful improvement in the manufacture of a new class of brown coloring-matters from resorcine when combined with diazo compounds, for dyeing and printing, of which the following is a specification.

Mono or poly atomic phenols have up to the present been combined in different ways with the diazo compounds. In that way the hydroxyle derivatives of the azo compounds were formed. A great number of these substances have been employed as coloring-matters. They include, in one molecule, only one of nitrogen, derived from the diazo compounds. From theoretical reasons I have concluded that the resorcine, which in this direction has not yet been examined, must be of a different character, and I have in fact proved, by numerous experiments, that resorcine which has already taken up one diazo molecule may with the greatest ease be combined with any diazo compound a second time. For the preparation of these substances I proceed in the following way: Any primary amine is combined with resorcine (in aqueous alkaline solution) in the way sufficiently known.

The general reaction may be shown by the following equations:

$$RNH_2HCl + NO_2H = RNNCl + 2H_2O.$$

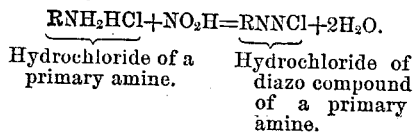

Hydrochloride of a primary amine.   Hydrochloride of diazo compound of a primary amine.

$$RNNCl + C_6H_4(OH)_2 = HCl + RNNC_6H_3(OH)_2.$$

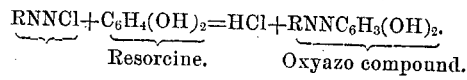

Resorcine.   Oxyazo compound.

Coloring-matter derived from aniline resorcine and sulphanilic acid is obtained by the following process: Ninety-three kilograms of aniline are diazotized in the well-known way and then combined with one hundred and ten kilograms of resorcine. The product is dissolved in caustic soda, and then combined again with diazo-sulphanilic acid which has been prepared in the well-known way from one hundred and seventy-three kilograms of sulphanilic acid. The coloring-matter is precipitated with salt from the solution, separated by a filter-press, and dried. A dark-brown powder is thus formed, being easily soluble in water, which can be applied for dyeing in the same way as the azo colors in general. On wool and silk fine reddish-brown shades are obtained.

Having thus described my invention, what I claim is—

The brown coloring-matter obtained by the process substantially as described and herein set forth.

In testimony whereof I have signed this specification in the presence of two subscribing witnesses.

O. WALLACH.

Witnesses:
A. HEIDELBERGER,
CARL ED. HALY.